United States Patent [19]

Matano et al.

[11] Patent Number: 5,061,307
[45] Date of Patent: Oct. 29, 1991

[54] CRYSTALLIZED GLASS HAVING NATURAL-MARBLE-LIKE SURFACE PATTERNS AND METHOD OF PRODUCING THE SAME

[75] Inventors: Takahiro Matano, Kusatsu; Yoshio Hashibe, Shiga; Masayuki Ninomiya, Moriguchi; Takehiro Shibuya, Otsu, all of Japan

[73] Assignee: Nippon Electric Glass Co., Ltd., Otsu, Japan

[21] Appl. No.: 636,873

[22] Filed: Jan. 2, 1991

[30] Foreign Application Priority Data

Jan. 5, 1990 [JP] Japan ..................... 2-884

[51] Int. Cl.$^5$ ............................................. C03C 10/04
[52] U.S. Cl. ........................................... 65/18.4; 65/33
[58] Field of Search .................. 65/18.1, 18.4, 33; 501/5

[56] References Cited

U.S. PATENT DOCUMENTS

| | | | |
|---|---|---|---|
| 3,809,543 | 5/1974 | Gaskell | 65/33 |
| 3,907,577 | 9/1975 | Kiefer | 65/33 |
| 3,964,917 | 6/1976 | Nakamura | 65/33 |
| 4,643,982 | 2/1987 | Kasuga | 501/5 |

*Primary Examiner*—Richard V. Fisher
*Assistant Examiner*—John M. Hoffmann
*Attorney, Agent, or Firm*—Collard, Roe & Galgano

[57] ABSTRACT

A crystallized glass having natural-marble-like surface patterns comprising 45 to 75 wt. % of $SiO_2$, 1 to 25 wt. % of $Al_2O_3$, 1 to 20 wt. % of CaO, 0.5 to 17 wt. % of MgO, 0.1 to 18 wt. % of BaO, 0 to 18 wt. % of ZnO, 1 to 15 wt. % of $Na_2O$, 0 to 7 wt. % of $K_2O$, 0 to 5 wt. % of $Li_2O$, 0 to 10 wt. % of $B_2O_3$, 0 to 10 wt. % of $P_2O_5$, 0 to 1 wt. % of $As_2O_3$, and 0 to 1 wt. % of $Sb_2O_3$, substantially free from nucleating agent, in which diopside type crystals are precipitated, and a method of producing the crystallized glass are disclosed.

2 Claims, No Drawings

CRYSTALLIZED GLASS HAVING NATURAL-MARBLE-LIKE SURFACE PATTERNS AND METHOD OF PRODUCING THE SAME

BACKGROUND OF THE INVENTION

1) Field of the Invention

The present invention relates to a crystallized glass having natural-marble-like surface patterns, more particularly to a crystallized glass of a pyroxene type, in particular, a crystallized glass of a diopside type, for use as a building material, and a method of producing the crystallized glass.

2) Description of the Prior Art

Crystallized glasses obtained by subjecting glass to a heat treatment have superior characteristics which make them very desirable as building materials in place of natural stones such as marble or granite. Conventionally, β-wollastonite or forsterite types of crystallized glasses have been mainly utilized in crystallized glasses used as building materials, but, recently, crystallized diopside ($CaO.MgO.2SiO_2$) and enstatite ($MgO.SiO_2$) which have particularly superior resistance to chemicals and superior mechanical strength have been attracting a great deal of attention for use in such applications. For example, methods of producing pyroxene type crystallized glass using $TiO_2$ or fluorine as a nucleating agent have been disclosed in Japanese Laid-Open Patent Application 61-256940 and in Japanese Laid-Open Patent Application 62-108742.

I the methods of producing pyroxene type crystallized glass disclosed in Japanese Laid-Open Patent Application 61-256940 and in Japanese Laid-Open Patent Application 62-108742, a fused glass is first molded into a predetermined shape to make a base glass by a roll-out method, then the base glass is crystallized by a heat treatment. For this recrystallization, a nucleating agent is an indispensable component. However, $TiO_2$ used as a nucleating agent is so expensive that it is difficult to hold down the raw material costs. Fluorine, on the other hand, is a noxious material and special equipment is required to prevent its escape into the atmosphere. In addition to these problems, with the above-mentioned method it is ver difficult to control the various process conditions such as the molding temperature when the base glass is made. This has the effect of restricting the production, and because the base glass remains under strain, an annealling furnace is necessary, making it difficult to produce this crystallized glass in large quantity at low cost.

In addition, it is desirable that the heat treatment temperature, when the crystallized glass is reheated after crystallization to carry out a bending operation, be 800° C. or lower. Specifically, at this temperature, the dies and other incidental equipment used in the bending process are damaged, and because the formed crystals are melted at the high temperatures, the inherent characteristics of the crystallized glass deteriorate. In addition, because large quantities of pyroxene type crystals must be contained to obtain the desired characteristics with the above method, the crystallinity is inevitably high. The result is that the deformation temperature (Tf) of the crystallized glass obtained is high and it is difficult to perform the bending process at a heat treatment temperature below 800° C.

Another problem inherent in this method is that, even by slight changes in the amount of a nucleation agent contained and in the crystallizing conditions, it occurs that the crystals do not grow uniformly, so accordingly, it is difficult to obtain the desired natural stone patterns.

SUMMARY OF THE INVENTION

Accordingly, a first object of the present invention is to provide a crystallized glass having natural-marble-like surface patterns, of a pyroxene type, in particular, a crystallized glass of a diopside type, for use as a building material, from which the drawbacks of conventional pyroxene type crystallized glasses have been eliminated, by which the desired natural stone patterns are obtained, and which can be subjected to a bending process without difficulty by reheating subsequent to crystallization.

A second object of the present invention is to provide a method of producing the above crystallized glass at low cost and high yield.

The first object of the present invention is achieved by a crystallized glass having natural-marble-like surface patterns comprising 45 to 75 wt. % of $SiO_2$, 1 to 25 wt. % of $Al_2O_3$, 1 to 20 wt. % of CaO, 0.5 to 17 wt. % of MgO, 0.1 to 18 wt. % of BaO, 0 to 18 wt. % of ZnO, 1 to 15 wt. % of $Na_2O_3$, 0 to 7 wt. % of $K_2O$, 0 to 5 wt. % of $Li_2O$, 0 to 10 wt. % of $B_2O_3$, 0 to 10 wt. % of $P_2O_5$, 0 to 1 wt. % of $As_2O_3$, and 0 to 1 wt. % of $Sb_2O_3$, substantially free from nucleating agent, in which diopside type crystals are precipitated.

The second object of the present invention is achieved by a method comprising the steps of (a) preparing small glass masses which comprise 45 to 75 wt. % of $SiO_2$, 1 to 25 wt. % of $Al_2O_3$, 1 to 20 wt. % of CaO, 0.5 to 17 wt. % of MgO, 0.1 to 18 wt. % of BaO, 0 to 18 wt. % of ZnO, 1 to 15 wt. % of $Na_2O$, 0 to 7 wt. % of $K_2O$, 0 to 5 wt. % of $Li_2O$, 0 to 10 wt. % of $B_2O_3$, 0 to 10 wt. % of $P_2O_5$, 0 to 1 wt. % of $As_2O_3$, and 0 to 1 wt. % of $Sb_2O_3$, substantially free from nucleating agent; (b) accumulating the small glass masses in a molding box; and (c) heat treating the small glass masses to thereby precipitate diopside type crystals from the surface of each of the glass masses into the interior thereof and fusion-bond the glass masses to one another.

DESCRIPTION OF THE PREFERRED EMBODIMENTS

The crystallized glass of the present invention comprises 45 to 75 wt. %, preferably 50 to 73 wt. %, of $SiO_2$; 1 to 25 wt. %, preferably 2 to 23 wt. %, of $Al_2O_3$; 1 to 20 wt. % preferably 2 to 18 wt. %, of CaO; 0.5 to 17 wt. %, preferably 0.5 to 6 wt. % of MgO; 0.1 to 18 wt. %, preferably 0.2 to 15 wt. %, of BaO; 0 to 18 wt. %, preferably 0 to 15 wt. %, of ZnO; 1 to 15 wt. %, preferably 1 to 12 wt. %, of $Na_2O$; 0 to 7 wt. %, preferably 0.5 to 6 wt. %, of $K_2O$; 0 to 5 wt. %, preferably 0 to 4 wt. %, of $Li_2O$; 0 to 10 wt. %, preferably 0.1 to 8 wt. %, of $B_2O_3$; 0 to 10 wt. %, preferably 0 to 8 wt. %, of $P_2O_5$; 0 to 1 wt. % of $As_2O_3$; and 0 to 1 wt. % of $Sb_2O_3$, substantially free from nucleating agent, in which diopside-type crystals are precipitated.

The reasons for the above limitations on each component of the glass composition of the crystallized glass of the present invention are as follows.

If the $SiO_2$ content is less than 45 wt. %, devitrification is considerable; if greater than 75 wt. %, the viscosity of the glass increases and the flow characteristics worsen. If the flow characteristics are poor, the surface of the crystallized glass becomes rough because of the small glass masses which are not fused properly.

If the $Al_2O_3$ content is less than 1 wt. %, the formed crystals are rough and the flow characteristics worsen; if greater than 25 wt. %, the fusing characteristics are poor and the diopside crystals are not precipitated.

If the CaO content is less than 1 wt. %, the diopside crystals are precipitated only with difficulty; if greater than 20 wt. %, the flow characteristics are poor and different types of crystals, such as wollastonite (CaO.-$SiO_2$) crystal, are formed.

If the MgO content is less than 0.5 wt. %, the diopside crystals are precipitated only with difficulty; if greater than 17 wt. %, the flow characteristics worsen.

If the BaO content is less than 0.1 wt. %, the flow characteristics are poor; if greater than 18 wt. %, the diopside crystals are precipitated only with difficulty.

If the ZnO content is greater than 18 wt. %, the diopside crystals are precipitated only with difficulty.

If the $Na_2O$ content is less than 1 wt. %, the flow characteristics worsen; if greater than 15 wt. %, the resistance to chemicals deteriorates, the coefficient of thermal expansion increases, and there is a tendency for a plate made of the glass to be easily warped.

If the $K_2O$ content is greater than 7 wt. %, the weathering resistance decreases.

If the $Li_2O$ content is greater than 5 wt. %, the raw material cost increases undesirably.

If the $B_2O_3$ is greater than 10 wt. %, the diopside crystals are precipitated only with difficulty.

If the $P_2O_5$ is greater than 10 wt. %, crystallization occurs only with difficulty.

0 to 1 wt. % of $As_2O_3$ and $Sb_2O_3$ can be added as refining agents.

In addition to the components given above, the glass composition of the present invention can also contain conventional glass coloring agents such as the oxides of cobalt, manganese, chromium, copper, vanadium, iron, nickel, and the like. One type, or two or more types of these coloring agents can be added, up to 10 wt. % content.

In producing a crystallized glass of a diopside type by the method of the present invention, small masses of glass of the above-mentioned composition are first prepared. These small glass masses can be in the form of granulations, powder, small solid spheres, small fragments, rods, and the like. As a method of obtaining the small glass masses, a water quenching method, in which molten glass is poured into water and quenched, thereby forming the small glass masses, are preferable because it provides large volumes of small glass masses in a simple manner. The small glass masses are first classified to obtain glass masses in a suitable particle size range, and are then placed and accumulated in a mold in a desired shape. By heat treatment of the small glass masses, the glass masses are then softened and deformed, and integrally fusion-bonded to one another, and at the same time, diopside crystals are caused to precipitate from the surface of the small glass masses to give a crystallized glass of a diopside type. The thus precipitated glass crystals conform to the size and shape of the small glass masses, and fine and delicate patterns are obtained in the crystallized glass which provide an outer appearance of granite, marble, and other natural stones. By controlling the size of the small glass masses, a crystallized glass with the desired natural stone pattern is easily obtained.

By the method of the present invention, diopside, which is one of crystals in the pyroxene crystal group, is precipitated out. Diopside has particularly superior resistance to chemicals and superior mechanical strength, and for this reason the crystallized glass obtained by the method of the present invention is superior in the various characteristics which are important for use as a building material.

Because crystals other than diopside are not formed in the crystallized glass obtained by the method of the present invention, the crystallinity is low and the material has a comparatively low deformation temperature. Specifically, because the deformation temperature of the crystallized glass obtained by the method of the present invention is low, this material is soft and mobile in the glass matrix phase at heat treatment temperature in the 700° to 800° C. range, making it possible to bend the crystallized glass without degrading its characteristics.

The present invention will now be explained in detail with reference to the following examples, which are given for illustration of the invention and are not intended to be limiting thereof.

EXAMPLE 1

A mixture of the following components was melted at 1500° C. for 16 hours to prepare a melted glass:

|  | wt. % |
|---|---|
| $SiO_2$ | 63.0 |
| $Al_2O_3$ | 10.0 |
| CaO | 8.0 |
| MgO | 4.5 |
| BaO | 4.5 |
| $Na_2O$ | 5.6 |
| $K_2O$ | 3.0 |
| $B_2O_3$ | 1.0 |
| $Sb_2O_3$ | 0.4 |

The melted glass was water-quenched to give granulated small glass masses. The small glass masses obtained in this manner were classified to obtain the fraction with particle diameters in the 1 to 6 mm range, then these masses were accumulated in a molding box, the inner walls of which were coated with alumina powder. The molding box containing the small glass masses was placed in a furnace and heated from room temperature to 1050° C., which is the crystallization temperature of the sample, as given in the Table, at a heating rate of 120° C./hour. After holding a the crystallization temperature for about 2 hours, the furnace was cooled down, whereby a crystallized glass plate was obtained.

When the surface of the sample thus obtained was polished, natural-marble-like surface patterns were observed in the surface. Each marble pattern corresponded to each glass mass used in the base glass.

The precipitated crystal, the crystallinity, and the deformation temperature of the crystallized glass obtained are set forth in TABLE. In this Example, the precipitated crystal was diopside only. The crystallinity was 25 wt. %, and the deformation temperature (Tf) was 680° C.

The glass plate obtained in this Example was then placed on a 950 R fireproof mold frame, heated to 700° to 800° C. and held for 30 minutes, then subjected to a bending process. As a result, a 950 R curved glass plate was obtained. The surface state of this glass plate was exactly the same as that prior to the bending process.

EXAMPLES 2 to 5

The procedure for Example 1 was repeated except that the formulation for each glass was replaced by the formulation set forth in TABLE, whereby crystallized glass plates were obtained.

When the surface of each glass plate thus obtained was polished, a natural marble pattern was observed in all glass plates. Each marble pattern also corresponded to each glass mass used in the base glass in these samples.

The precipitated crystal, the crystallinity, and the deformation temperature of these crystallized glasses are set forth in the Table. As shown in the Table, in these samples, the precipitated crystal was diopside only as in Example 1, the crystallinity was in the range of 20 to 28 wt. %, and the deformation temperature (Tf) was in the range of 630 to 690° C. as shown in TABLE.

The glass plates obtained in these Examples were then placed on a 950 R fireproof mold frame, heated to 700° to 800° C. and held for 30 minutes, then subjected to a bending process. As a result, 950 R curved glass plates were obtained in the same manner as in Example 1. The surface state of each glass plate was exactly the same as that prior to the bending process.

COMPARATIVE EXAMPLE

The procedure for Example 1 was repeated except that the formulation for the glass was replaced by the formulation set forth in TABLE, whereby a comparative crystallized glass plate was obtained.

The precipitated crystal, the crystallinity, and the deformation temperature of this comparative crystallized glass are respectively 40 wt. % and 900° C. as set forth in TABLE, which are significantly higher than those of the crystallized glasses in Examples 1 to 5 according to the present invention. As shown in the Table, the precipitated crystals were not only diopside, but also enstatite and α-cordierite ($2MgO.2Al_2O_3.5SiO_2$).

The comparative glass plate obtained was placed on a 950 R fireproof mold frame, heated to 700° to 800° C. and held for 30 minutes, then subjected to a bending process. The comparative glass plate exhibited no bending.

TABLE (wt. %)

| Composition | Ex. 1 | 2 | 3 | 4 | 5 | Comp. Ex. |
|---|---|---|---|---|---|---|
| $SiO_2$ | 63.0 | 60.0 | 68.0 | 61.0 | 62.0 | 62.5 |
| $Al_2O_3$ | 10.0 | 6.0 | 5.0 | 7.0 | 9.0 | 6.5 |
| CaO | 8.0 | 7.6 | 8.0 | 7.0 | 9.0 | 4.0 |
| MgO | 4.5 | 3.8 | 4.8 | 3.0 | 4.5 | 12.0 |
| BaO | 4.5 | 3.5 | 5.0 | 9.0 | 4.6 | — |
| ZnO | — | 6.5 | — | 6.0 | — | 3.8 |
| $Na_2O$ | 5.6 | 4.3 | 6.2 | 3.4 | 5.0 | 5.0 |
| $K_2O$ | 3.0 | 2.5 | 2.0 | 2.2 | 3.0 | — |
| $Li_2O$ | — | — | — | 0.5 | — | 0.45 |
| $B_2O_3$ | 1.0 | 5.4 | 0.6 | 0.5 | 0.5 | 2.5 |
| $P_2O_5$ | — | — | — | — | 2.0 | 0.9 |
| $TiO_2$ | — | — | — | — | — | 1.9 |
| $F_2$ | — | — | — | — | — | 0.45 |
| $As_2O_3$ | — | — | — | — | 0.4 | — |
| $Sb_2O_3$ | 0.4 | 0.4 | 0.4 | 0.4 | — | — |
| Temperature of Crystallization (°C.) | 1050 | 1050 | 1100 | 1050 | 1050 | 1050 |
| Precipitated Crystal(s) * | A | A | A | A | A | A + B + C |
| Crystallinity (wt. %) | 25 | 20 | 28 | 27 | 24 | 40 |
| Deformation Temperature Tf (°C.) | 680 | 670 | 690 | 630 | 685 | 900 |

\* A ... Diopside
B ... Enstatite
C ... α-Cordierite

The above results show that, using the method of the present invention, a crystallized glass can be obtained in which diopside type crystals only are formed without using a nucleating agent, and by adjusting the particle diameters of the small glass masses the desired natural marble pattern can be obtained. Also, because the crystallinity and the deformation temperature are low, it is possible to bend the glass.

In addition, when the chemical resistance and mechanical strength of the crystallized glass obtained by the method of the present invention are measured, the results are much better than for a conventional crystallized glass of a pyroxene type, showing that the crystallized glass of the present invention is suitable as a building material.

The crystal type and the crystallinity given in TABLE were obtained by the X-ray diffraction method. The deformation temperature was measured using a dilatometer.

The method of producing a crystallized glass having natural-marble-type surface patterns of the present invention does not require a nucleating agent such as $TiO_2$ or fluorine and is capable of producing the crystallized glass at high yield, so that the raw material costs and manufacturing costs can be considerably reduced. By adjusting the particle diameters of the small glass masses, the desired natural marble pattern can be obtained. In addition, because a bending process can be applied by reheating the crystallized glass, it is possible to use this material in curved surfaces and the like.

What is claimed is:

1. A method of producing a crystallized glass having natural-marble-like surface patterns comprising the steps of:
    (a) preparing small glass masses which comprise 45 to 75 wt. % $SiO_2$, 1 to 25 wt. % of $Al_2O_3$, 1 to 20 wt. % of CaO, 0.5 to 17 wt. % of MgO, 0.1 to 18 wt. % of BaO, 0 to 18 wt. % of ZnO, 1 to 15 wt. % of $Na_2O$, 0 to 7 wt. % of $K_2O$, 0 to 5 wt. % of $Li_2O$, 0 to 10 wt. % of $B_2O_3$, 0 to 10 wt. % of $P_2O_5$, 0 to 1 wt. % of $As_2O_3$, and 0 to 1 wt. % of $Sb_2O_3$, substantially free from nucleating agent;

(b) accumulating said small glass masses in a molding box; and (c) heat treating said small glass masses to thereby precipitate diopside type crystals from the surface of each of said glass masses into the interior thereof and fusion-bond said glass masses to one another.

2. The method of producing a crystallized glass having natural-marble-like surface patterns as claimed in claim 1, wherein said small glass masses comprise 50 to 73 wt. % of $SiO_2$; 2 to 23 wt. % of $Al_2O_3$; 2 to 18 wt. % of CaO; 0.5 to 6 wt. % of MgO; 0.2 to 15 wt. % of BaO; 0 to 15 wt. % of ZnO; 1 to 12 wt. % of $Na_2O$; 0.5 to 6 wt. % of $K_2O$; 0 to 4 wt. % of $Li_2O$; 0.1 to 8 wt. % of $B_2O_3$; 0 to 8 wt. % of $P_2O_5$; 0 to 1 wt. % of $As_2O_3$; and 0 to 1 wt. % of $Sb_2O_3$, substantially free from nucleating agent.

* * * * *